July 7, 1931. V. V. SAKS 1,813,822
SLUDGE REMOVER
Filed May 24, 1928 2 Sheets-Sheet 1
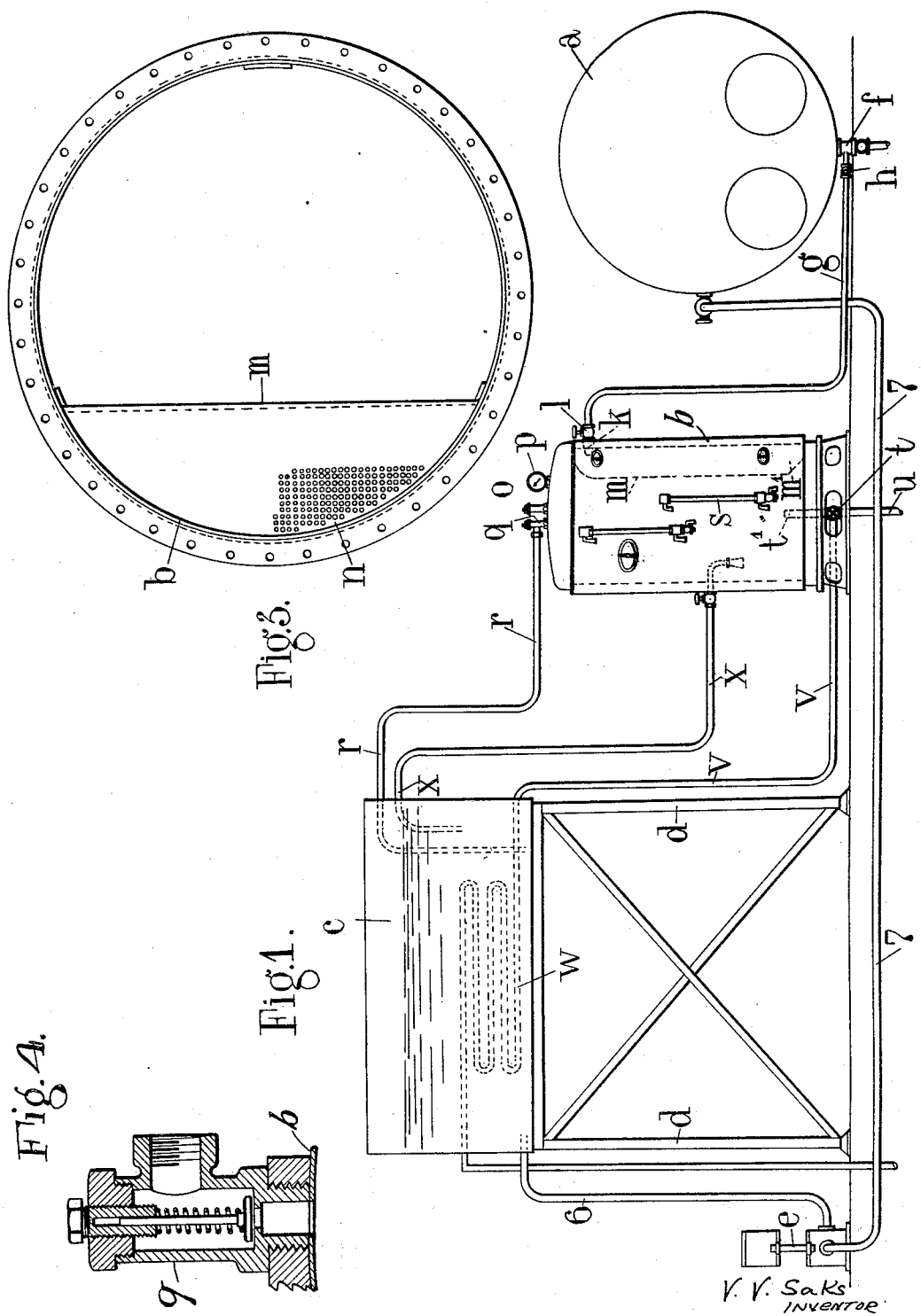
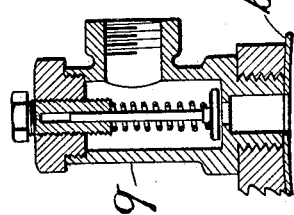
V. V. Saks
INVENTOR

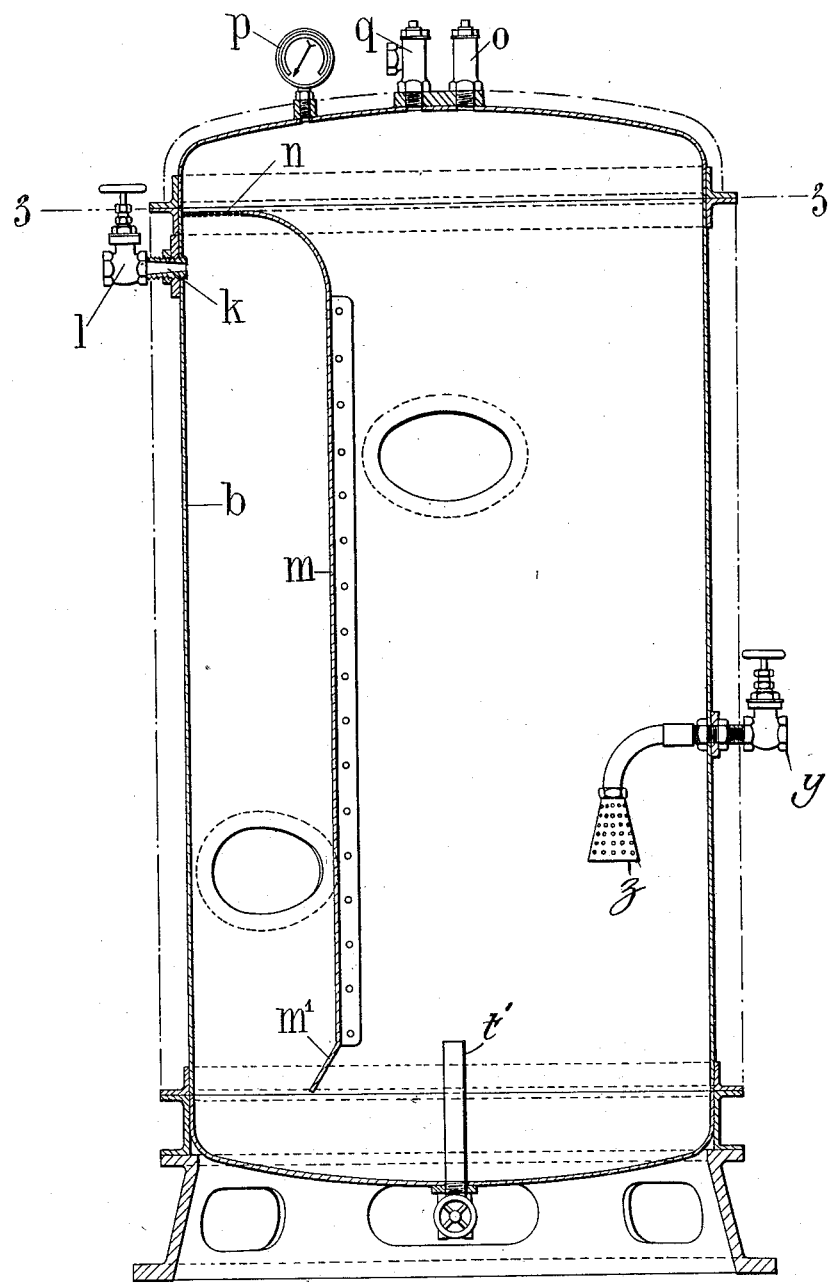

Patented July 7, 1931

1,813,822

UNITED STATES PATENT OFFICE

VADIM VLADIMIROVITCH SAKS, OF LONDON, ENGLAND, ASSIGNOR OF ONE-HALF TO FILTRATORS, LIMITED, OF LONDON, ENGLAND

SLUDGE REMOVER

Application filed May 24, 1928, Serial No. 280,350, and in Great Britain June 22, 1927.

This invention relates to the removal of sludge from the water blown out from boilers, so that the clarified water or part of it may be delivered to the feed tank and be subsequently returned to the boiler.

In cases where the boilers are periodically blown down, or where there is a constant minimum blow down to preserve a constant degree of salinity for example, there is a considerable waste of heat when the water at boiler temperature is discharged into atmosphere.

According to the present invention a simple and effective form of apparatus is provided by which the water, continuously or intermittently blown down from the boiler, is free from sludge and then passed into the feed tank, after which it may be returned to the boiler.

The invention has among its objects to utilize the heat of the water thus treated and to ensure economy in the working of the plant.

The invention consists in a sludge remover and density deconcentrator comprising a vessel into which the blow-down water from the boiler is discharged, so that the water may accumulate in its lower part and sludge be allowed to settle, while steam may be retained under pressure in the upper part of the vessel and part of the steam utilized to heat the water in the feed water tank, the steam under pressure in the vessel being utilized to force the clarified water into the feed water tank.

The invention is hereinafter described with reference to the accompanying drawings, in which:

Figure 1 is a diagrammatic elevational view of a plant constructed according to the invention.

Figure 2 is a sectional elevation on an enlarged scale of the steam and water separating receptacle which forms a part of the plant in Figure 1, Figure 3 is a horizontal section taken on the line 3—3, Figure 2.

Figure 4 is a detail view of the construction of a reducing valve $q$ that may be employed.

In carrying the invention into effect, and referring more particularly to Figure 1, $a$ indicates the boiler, $b$ the steam and water separating vessel, $c$ the feed water tank mounted on a tower $d$, and $e$ the pump for returning the water to the boiler. The blow down pipe $f$ from the boiler has a branch $g$ controlled by a valve $h$, by which the sludge containing water is led into the upper end of the vessel $b$ through a valve $l$ and a nozzle $k$. The vessel $b$ takes the form of a closed cylindrical vessel which is well lagged to avoid outward radiation of heat and is fitted with a partition wall $m$ which depends from the upper end of the vessel and extends nearly to the bottom thereof, thus forming a pocket at one side of the vessel. The boiler water and sludge enter the vessel $b$ through the nozzle $k$ and steam accumulates in the upper part of the vessel $b$ and passes through holes $n$ in the upper part of the partition $m$. The water and sludge pass down to the bottom of the vessel $b$, under the partition and the sludge settles at the bottom, leaving the water clean. Thus within the vessel $b$ there is an upper steam space, and a lower water space. At the top of the vessel a safety valve $o$, a pressure gauge $p$ and an adjustable relief valve $q$ are mounted from which latter a pipe $r$ branches so that excess steam at above a certain pressure may pass into the feed tank $c$, the end of the pipe $r$ passing down into the tank $c$ close to the bottom. The excess steam is thus utilized to heat the feed water.

In order that the blow down water admitted into the vessel $b$, shall disturb the deposited sludge as little as possible, the bottom of the partition wall $m$ is bent inward as at $m'$. The vessel $b$ is fitted with a water level gauge $s$, and with a controllable multiway valve $t$.

In one position of this valve the water from the vessel $b$ may be blown out full bore through the pipe $u$, or an interchangeable nipple (not shown) may be provided to give a regulated constant discharge through the pipe $u$ thereby maintaining a standard low density of water. The water passing to the multi-way valve $t$ may do so by way of a short tube $t'$ extending upward above the bottom of the vessel $b$.

Alternatively or additionally the water and the sludge may be led through pipe $v$ from the multi-way valve through a coil $w$ serving to heat the water in the feed tank $c$.

It is advisable to have the inlet nozzle $k$ of not less than say 1/8th of an inch in diameter. Thus taking into consideration the high pressure head under which the boiler water will be discharged into the vessel $b$, a much greater amount of water than that which is required to keep the desired density in the boilers will be discharged through the nozzle $k$.

In order to deal with this excess of water, the vessel $b$ about midway of its height or somewhat above, is fitted with an outlet pipe $x$ which discharges into the tank $c$. The pipe $x$ is provided with a valve at $y$ and has a strainer $z$ on its inner down-turned end. The normal pressure within the vessel $b$ will be sufficient to force the clarified water through the pipe $x$ up into the tank. Finally the water from the feed tank passes by way of the outlet pipe 6 to the feed pump $e$ which returns it to the boiler by pipe 7.

The function of the apparatus is as follows:

The boiler water is discharged into the vessel $b$ through valve $l$ and nozzle $k$. A determined steam pressure is maintained in the vessel $b$ and the excess steam is conveyed through the adjustable valve $q$ to the feed tank $c$, and the sludge in the water settles at the bottom of the vessel. The necessary amount of the concentrated discharge water is extracted from the bottom of the vessel $b$ through the multi-way valve $t$, and the excess water is conveyed to the feed tank by pipe $x$ under the pressure of steam within the vessel. This excess water will be practically clean and although it has approximately the same density as the boiler water, it will be soft by its having been already heat treated in the boiler.

If there be an internal pressure in the vessel of say eight lbs. per square inch, the excess water as well as the blow down water from the apparatus can be raised to the feed tank say 20 feet high, without a pump.

Having now described my invention, what I claim as new and desire to secure by Letters Patent is:—

1. An apparatus for the automatic control of the density of boiler water and for its clarification, during the use of a steam generator comprising in combination, a completely closed and heat insulated vessel in continuous communication with a steam generator, the steam generator, a pipe by which the communication is maintained between them, the said pipe being at one end connected to the steam generator at a position at which the boiler water sludge is accessible, and at its opposite end to the said vessel at a position other than at the lower part thereof, a sludge and water outlet pipe at the lower part of the said vessel, means for controlling the outlet therethrough, a relief valve at the upper part of the said vessel, the said relief valve being adapted to release steam from within the said vessel and to maintain a determined maximum pressure of steam within the said vessel, a feed water tank for the said steam generator, a pipe communicating between the said relief valve and the said feed water tank, and adapted to convey steam from the said vessel to the said feed water tank, and a water outlet pipe communicating from a position above the bottom of the said vessel and between the said vessel and the said feed water tank, substantially as hereinbefore described.

2. An apparatus for the automatic control of the density of boiler water and for its clarification during the use of a steam generator, comprising in combination a completely closed and heat insulated vessel in continuous communication with a steam generator, the steam generator, a pipe by which the communication is maintained between them, the said pipe being at one end connected to the steam generator at a position at which the boiler water sludge is accessible, and at its opposite end to the said vessel at a position other than at the lower part thereof, a sludge and water outlet pipe at the lower part of the said vessel, means for controlling the outlet therethrough, a relief valve at the upper part of the said vessel, the said relief valve being adapted to release steam from within the said vessel and to maintain a determined maximum pressure of steam within the said vessel, a feed water tank for the said steam generator disposed above the said vessel, a pipe communicating between the said relief valve and the said feed water tank and adapted to convey steam from the said vessel to the said feed water tank, and a water outlet pipe communicating from a position above the bottom of the said vessel and between the said vessel and the said feed water tank, substantially as hereinbefore described.

3. An apparatus for the automatic control of the density of boiler water and for its clarification during the use of a steam generator, comprising in combination a completely closed and heat insulated vessel in continuous communication with a steam generator, the steam generator, a pipe by which the communication is maintained between them, the said pipe being at one end connected to the steam generator at a position at which the boiler water sludge is accessible and at its opposite end to the said vessel at a position other than at the lower part thereof, a sludge and water outlet pipe at the lower part of the said vessel, means for controlling the outlet therethrough, a relief valve at the upper part of the said vessel adapted to release steam from within the said vessel and to maintain a determined maximum pressure of steam within the said vessel, a feed water tank for the said steam generator, a pipe communicating between the said relief valve and the said feed water tank and adapted to convey steam into the said feed water tank, a water outlet pipe communicating from a position above the bottom of the said vessel and between the said vessel and the said feed water tank, and a coil of piping in the said feed water tank connected and communicating with the sludge and water outlet pipe at the lower part of the said vessel, substantially as hereinbefore described.

4. An apparatus for the automatic control of the density of boiler water and for its clarification during the use of a steam generator, comprising in combination a completely closed and heat insulated vessel having a substantially vertical pocket formed within it adjacent the wall of the vessel open at the lower part, the said pocket being formed by a substantially vertical partition provided with perforations at its upper part, the said vessel being in continuous communication with a steam generator, the steam generator, a pipe by which the communication is maintained between them, the said pipe being at one end connected to the steam generator at a position at which the boiler water sludge is accessible and at its opposite end to the said vessel at a position adjacent the upper end of the said pocket, a sludge and water outlet pipe at the lower part of the said vessel, means for controlling the outlet therethrough, a relief valve at the upper part of the said vessel adapted to release steam from within the said vessel and to maintain a determined maximum pressure of steam within the said vessel, a feed water tank for the said steam generator, a pipe communicating between the said relief valve and the said feed water tank and adapted to convey steam into the said feed water tank, and a water outlet pipe communicating from a position above the bottom of the said vessel and between the said vessel and the said feed water tank, substantially as hereinbefore described.

In testimony whereof I have signed my name to this specification.

VADIM VLADIMIROVITCH SAKS.